Figure 4:
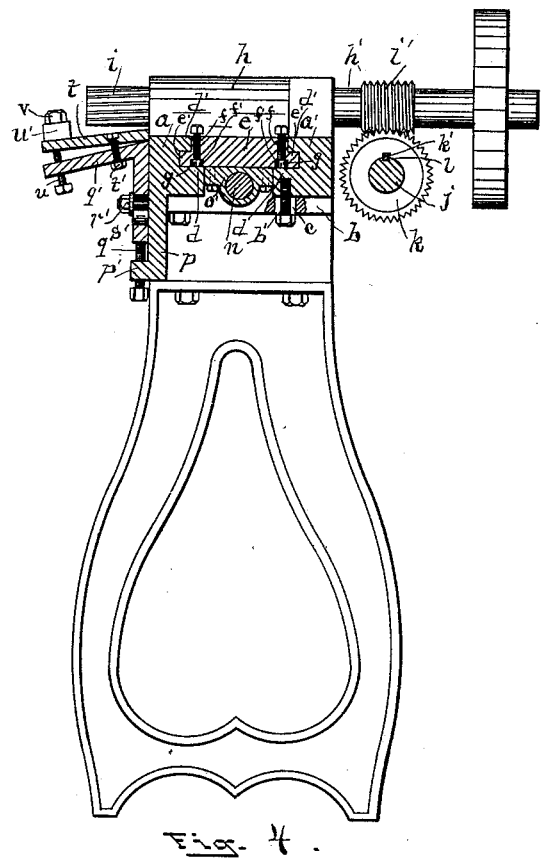

(No Model.) 2 Sheets—Sheet 1.
A. S. PARKE.
SAW SCARFING MACHINE.
No. 415,281. Patented Nov. 19, 1889.
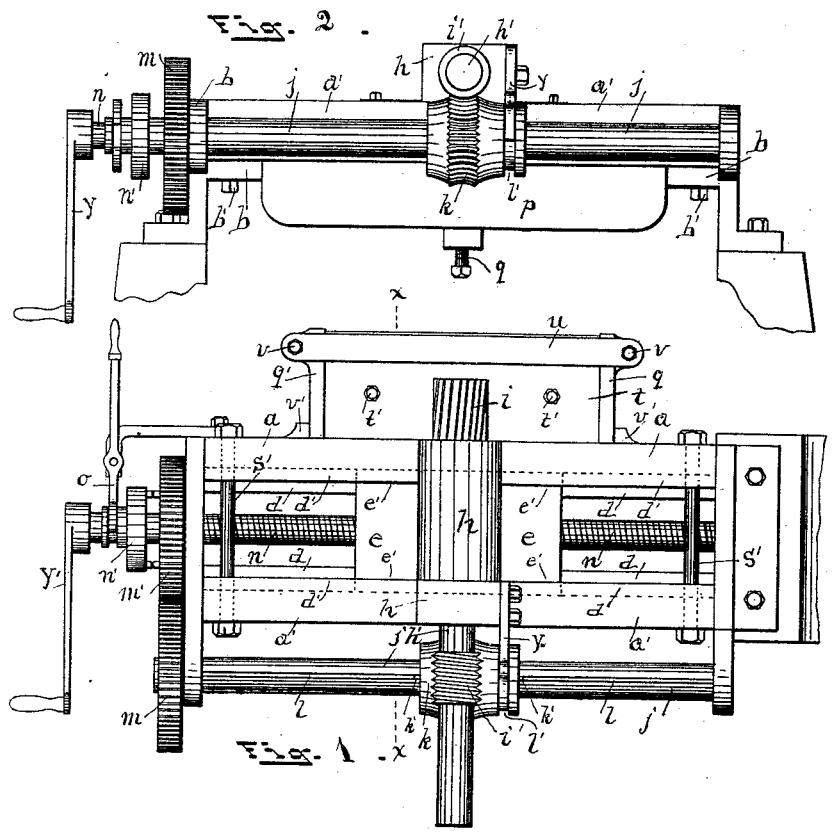
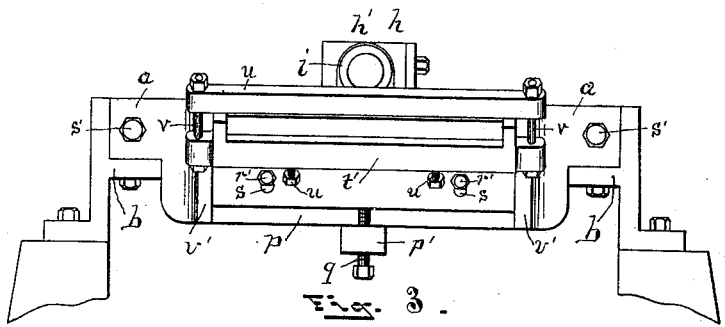
Attest:
J. O. Thomas
F. A. McKay.
Inventor:
Amos S. Parke
By Jas. E. Thomas.
Atty.

(No Model.) 2 Sheets—Sheet 2.

A. S. PARKE.
SAW SCARFING MACHINE.

No. 415,281. Patented Nov. 19, 1889.

ATTEST:
G. P. Thomas
F. A. McKay

INVENTOR:
Amos S. Parke.
By
Jas. E. Thomas.
Atty.

UNITED STATES PATENT OFFICE.

AMOS S. PARKE, OF BAY CITY, MICHIGAN.

SAW-SCARFING MACHINE.

SPECIFICATION forming part of Letters Patent No. 415,281, dated November 19, 1889.

Application filed September 13, 1889. Serial No. 323,859. (No model.)

*To all whom it may concern:*

Be it known that I, AMOS S. PARKE, a citizen of the United States, residing at Bay City, in the county of Bay and State of Michigan, have invented certain new and useful Improvements in Saw-Scarfing Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention pertains to machines for scarfing the ends of band-saws, or for forming on the end of a band-saw suitable beveled portions which may be lapped upon each other and brazed together, and thereby form a continuous saw-plate; and the invention consists in the arrangement and combination of the several devices used in the construction of the machine, as I hereinafter more fully elucidate in the specification, and specifically set forth in the claims which follow.

The objects of my invention are to construct a machine for preparing the ends of band-saws for brazing together in a manner that the scarf or beveled portion thereof will be more uniform and even, and so that the lapped portion after being brazed will be of a thickness uniform with the solid portions of the plate, and also so that the front and rear edges of the plate will be uniform or of the same thickness.

A further object is to arrange the parts of the machine in a manner that the feeding will be more regular and even.

Another object is to form a more convenient and accurate means of adjusting the saw-plate-securing devices in relation to the milling-cutter, whereby the width of the bevel formed on the plate may be changed without changing the position of the plate vertically or requiring a readjustment of the plate in relation to the cutter.

I attain these objects by means of the devices illustrated in the accompanying drawings, and in which—

Figure 1 is a top or plan view of my improved saw-scarfing machine. Fig. 2 is a view in elevation of the rear side of the same. Fig. 3 is a view in elevation of the front side of the machine. Fig. 4 is a vertical section of Fig. 1 at $x$ $x$.

$a$ and $a'$ represent front and rear bed or side pieces of the machine, and $b$ are cross-pieces secured firmly to the ends of the side piece $a$ by bolts, or are cast integral therewith and secured to the ends of the side piece $a'$ by bolts $b'$, which pass through slots $c$ and are tapped into the side piece, the slots $c$ allowing the side pieces to be adjusted to or from each other, as desired, by means of the bolts $s'$, which are passed through both side pieces near their ends, and which also retain the side pieces in position. The inner or adjacent sides of the pieces $a$ and $a'$ are provided with a groove $c'$, the lower lip or portion $d$ extending inwardly considerably beyond the upper lip or portion $d'$.

$e$ is a carriage having its lateral side edges provided with tongues $e'$, which fit into the grooves $c'$ and vertically through the carriage, and above the lower lip $d$ are arranged screw-threaded openings $f$, the lower portions of the openings being counterbored, forming the chambers $f'$, in which are placed the plugs $g$, of brass or other suitable anti-friction metal; and $g'$ are adjusting-screws passed into the threaded openings $f'$, so that when the bolts are screwed inwardly the plugs $g$ are forced against the lips $d$, which arrangement allows the wear and vertical looseness to be taken up when necessary, while the bolts $s'$ and slots $c$ permit the lateral wear to be taken up, so that the carriage can be rendered at all times firm and solid.

Upon the upper surface of the carriage and across the same is placed a journal-box $h$, which carries a shaft $h'$. The outer end of the shaft upon the front is provided with a rotary cutter $i$, and upon the shaft at the opposite end of the box $h$ is arranged a worm $i'$, and the shaft extending beyond the worm is provided with a crank or pulley, by which motion is imparted to the shaft by hand or other power, as desired. Beneath the worm $i'$ and beside the rear side piece $a'$ is placed a shaft $j$, suitably mounted upon journal-boxes $j'$ at the ends of the bed-piece; and $k$ is a worm gear-wheel mounted upon the shaft beneath and engaging with the worm $i'$, the central opening through the wheel being provided with a feather $k'$, which fits into the longitudinal groove $l$ in the shaft, and which operates to revolve the shaft with the revolution of the wheel, and at the same time allows the wheel to move endwise of the shaft. The wheel $k$ is provided on one end with a peripheral groove $l'$, into which is placed a fork $y$, the opposite end of the fork being secured to the side of the carriage $e$, which serves to retain the worm-wheel in proper position in relation to the worm $l'$.

Mounted upon the outer end of the shaft $j$ is a gear-wheel $m$, and $m'$ is a gear-wheel intermeshing with the gear-wheel $m$ and loosely mounted upon the outer end of a shaft $n$, which is located between the bed-pieces $a$ and $a'$ beneath the carriage, and supported by journal-boxes at the ends of the bed-pieces.

$n'$ is a clutch loosely mounted upon the outer end of the shaft $n$ and secured against turning on the shaft by a feather which allows an end movement of the clutch, which is arranged to engage with projections on the side of the wheel $m'$, so that when the clutch is in engagement with the wheel the shaft $n$ is caused to revolve with the wheel, and by disengaging the clutch from the wheel the shaft $n$ remains without revolution while the wheel $m'$ continues to revolve.

$o$ is a lever of any suitable construction, by means of which the clutch is operated.

The shaft $n$ is provided on the portion between the bed-pieces $a$ and $a'$ with a screw-thread, and $o'$ is a nut having a suitable opening provided with a screw-thread and passed upon the threaded shaft, and is also secured to the under side of the carriage $e$, so that by the revolution of the shaft a movement lengthwise of the bed-pieces $a$ and $a'$ is imparted to the carriage. The outer end of the shaft $n$, which projects beyond the clutch, is provided with a crank $y'$, with which to revolve the screw independent of the gear-wheels, so that the table may be moved and adjusted to position while the clutch is disengaged from the gear-wheel $m'$.

Extending downwardly from the lower edge of the side piece $a$ is a portion $p$, provided with a forwardly-projecting lug $p'$ on its lower edge, upwardly through which is passed an adjusting-screw $q$.

$q'$ is an inclined table, having a vertical apron $r$, which rests against the portion $p$ and between the forwardly-projecting ribs $v'$, and is secured thereto by the tap-bolts $r'$, which are passed through vertical slots $s$ in the apron, and which permit a vertical adjustment of the table by means of the screw $q$, which rests against the lower edge of the apron. Upon the table is placed a tilting plate $t$, with its inner edge resting upon the inner edge of the table, and is secured in position by the bolts $t'$, which pass through the plate and the table, and the outer edge of the tilting plate is arranged to rest upon the ends of the adjusting-screws $u$, which are tapped through the table near its outer edge, the plate being tilted to the required position by loosening the bolts $t'$ and turning the screws $u$ until the required angle of the plate is reached, and the screws $t'$ are again tightened to secure the plate.

$u'$ is a clamping-bar, which is placed across and with its ends projecting beyond the tilting plate, and $v$ are clamping-screws which pass through the ends of the bar and through the table, which extends beyond on each side of the tilting plate.

In practice the saw-plate is placed upon the tilting plate $t$ with its end beneath the cutter, and is then firmly clamped in position by the bolts $u$. The table and saw are then raised by the screw $q$ to allow the cutter to cut the end of the plate to a thin edge, the width of the bevel-cut being regulated by raising or lowering the outer edge of the tilting plate by the screws $u$. The saw being then in position, the clutch is engaged with the wheel $m'$, and, motion being imparted by suitable means to the cutter-shaft $h'$, revolving the cutter for operating upon the saw-plate, the cutter is carried forward to the work by the screw-shaft $n$, which is revolved by the gear-wheels and the worm-gear and worm, and the cutter in moving forward reduces the end of the saw-plate to a beveled or wedge-shaped end, and the opposite end of the plate, being also operated upon by the cutter, is also supplied with the corresponding beveled portion, and the two beveled surfaces, being overlapped and brazed, produce a joining of the plate which is true and even and of the same thickness on each edge of the plate and as the solid portions of the plate.

Of course it will be seen that by making the table to adjust vertically by means of the screw $q$ and to arrange the width of the scarf by adjusting the outer edge of the tilting plate a more accurate and finer adjustment may be obtained, and less time is consumed in arranging the machine to make beveled surfaces of different widths than with devices commonly constructed for that purpose.

The nut and feeding-screw being attached to the carriage near the cutter form a machine that is not liable to chatter and make an uneven cut on the saw-plate.

Another and very great advantage is gained in the construction of the carriage and the grooves which support the carriage, as the adjusting screws $g'$ and plugs $g$, while being cheap and easily constructed, form a means of taking up the wear of the slides easily and quickly, as well as the bolts $b'$ and the slots $c$, which allow the lateral wear to be taken up, whereby the carriage is firmly held in position, and the cutter is then sustained in a proper manner to the work.

Having described my improvement, what I claim as my invention, and desire to secure by Letters Patent, is—

1. In a saw-scarfing machine, the combination, with the carriage e, carrying the cutter and cutter-shaft, and provided with the tongues e' on its lateral sides, and the side pieces a and a', provided with grooves to receive the said tongues e', of the cross-pieces b, rigidly secured to the ends of one of the said side pieces and adjustably secured to the other side piece, and the adjusting-bolts s', passed through both of the side pieces, substantially as and for the purpose set forth.

2. In a saw-scarfing machine, the combination, with the side pieces a and a', provided with the grooves c', and the inwardly-projecting lower laps d, the carriage e, carrying the cutter-shaft and cutter and having laterally-projecting tongues resting in the said grooves c', and provided with the threaded openings f, and the chambers f' above the lips d, of the plugs g in the chambers f' and the screws g' in the threaded opening f above the plugs, substantially as and for the purpose set forth.

3. In a saw-scarfing machine, the combination, with the side pieces a and a', a carriage supported by the side pieces and carrying a rotary-cutter arbor provided with a cutter i on one end and with a worm-screw i' on the opposite end, a shaft j, journaled on the side of the side piece a' and carrying a gear-wheel k, engaging with the worm i', and a gear-wheel m, of a feeding-screw n, journaled between the side pieces a and a', and provided with a nut o', secured to the under side of the carriage e, and a gear-wheel m', intermeshing with the gear-wheel m, substantially as and for the purpose set forth.

4. In a saw-scarfing machine, the combination, with the side piece a, provided with a downwardly-extending portion p, having a forwardly-projecting lug p' and vertical ribs v', the side piece a', the carriage e, supported by the said side pieces and carrying a cutter-arbor and cutter, the inclined table q', having an apron r, provided with the slots s, and secured to the said portion p between the ribs by the bolts r' and the bolt q in the lug p' beneath the apron, of the tilting plate t, secured upon the table, with its inner edge resting upon the table and its outer edge resting upon the adjusting-screws u, substantially as and for the purpose set forth.

In testimony whereof I affix my signature in presence of two witnesses.

AMOS S. PARKE.

Witnesses:
JAS. E. THOMAS,
W. H. POWER.